(12) United States Patent
Müller et al.

(10) Patent No.: US 11,834,019 B2
(45) Date of Patent: Dec. 5, 2023

(54) HYDRAULIC BRAKING SYSTEM HAVING AN ELECTRONIC CONTROL UNIT AND METHOD FOR OPERATING SAME

(71) Applicant: KNORR-BREMSE SYSTEME FÜR SCHIENENFAHRZEUGE GMBH, Munich (DE)

(72) Inventors: Claus Müller, Wolfratshausen (DE); Reinhard Loebner, Munich (DE); Marcus Clev, Munich (DE); Fabian Elwischger, Neufahrn (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 144 days.

(21) Appl. No.: 16/635,716

(22) PCT Filed: Jul. 26, 2018

(86) PCT No.: PCT/EP2018/070304
§ 371 (c)(1),
(2) Date: Jan. 31, 2020

(87) PCT Pub. No.: WO2019/025282
PCT Pub. Date: Feb. 7, 2019

(65) Prior Publication Data
US 2021/0129818 A1 May 6, 2021

(30) Foreign Application Priority Data
Aug. 1, 2017 (DE) .................... 10 2017 117 399.4

(51) Int. Cl.
*B60T 13/16* (2006.01)
*B60T 13/68* (2006.01)
(Continued)

(52) U.S. Cl.
CPC .......... *B60T 13/686* (2013.01); *B60T 13/662* (2013.01); *B60T 13/16* (2013.01); *B60T 13/745* (2013.01); *B60Y 2400/81* (2013.01)

(58) Field of Classification Search
CPC .......... B60T 13/16; B60T 13/18; B60T 13/20; B60T 8/4059; B60T 8/4063;
(Continued)

(56) References Cited

U.S. PATENT DOCUMENTS 4,927,213 A * 5/1990 Burgdore .............. B60T 8/4063
303/10
6,328,388 B1 * 12/2001 Mohr .................... B60T 8/4827
188/162
(Continued)

FOREIGN PATENT DOCUMENTS

CN 206049646 U 3/2017
DE 102007028665 A1 1/2008
(Continued)

OTHER PUBLICATIONS

Machine translation of JP2005-119426, retrieved Jan. 28, 2023 (Year: 2023).*
(Continued)

*Primary Examiner* — Bradley T King
(74) *Attorney, Agent, or Firm* — Barnes & Thornburg LLP

(57) ABSTRACT

A Hydraulic braking system is for braking a vehicle wheel according to a braking pressure control that includes a hydraulic pump driven by an electric motor for hydraulic pressure generation, an electronic control unit for the determination of at least one control error, based on a measured actual braking pressure compared with a pressure demand setpoint, which controls at least one actuator for a pressure increase and/or a pressure reduction of the actual braking
(Continued)

pressure to adjust to the pressure demand setpoint. Furthermore, a method is provided for braking a vehicle wheel according to this braking pressure control and a related computer program product.

17 Claims, 1 Drawing Sheet

(51) Int. Cl.
  *B60T 13/66* (2006.01)
  *B60T 13/74* (2006.01)
(58) Field of Classification Search
  CPC .. B60T 8/1705; B60T 8/3235; B60T 2270/40; B60T 2270/402; B60T 2270/413; B60T 13/662; B60T 13/686; B60T 13/745; F16D 2121/06; B60Y 2400/81
  See application file for complete search history.

(56) References Cited

U.S. PATENT DOCUMENTS

| | | | | |
|---|---|---|---|---|
| 6,402,264 | B1 * | 6/2002 | Otomo | B60T 8/4081 303/155 |
| 6,969,126 | B2 * | 11/2005 | Ichinose | B60T 7/042 188/1.11 R |
| 2008/0224533 | A1 * | 9/2008 | Nakada | B60T 13/686 303/10 |
| 2013/0049449 | A1 * | 2/2013 | Watanabe | B60T 13/662 303/3 |
| 2013/0064704 | A1 * | 3/2013 | Nakamura | B60T 8/4031 418/104 |
| 2013/0076276 | A1 * | 3/2013 | Huwiler | H02P 3/18 318/127 |
| 2014/0374185 | A1 * | 12/2014 | Fischer | B60K 17/30 180/253 |
| 2016/0052494 | A1 * | 2/2016 | Yamamoto | B60T 8/4872 701/70 |

FOREIGN PATENT DOCUMENTS

| | | |
|---|---|---|
| DE | 102007019441 A1 | 10/2008 |
| DE | 112012006194 T5 | 12/2014 |
| JP | 2005119426 A * | 5/2005 |

OTHER PUBLICATIONS

International Search Report for corresponding to PCT/EP2018/070304 dated Oct. 29, 2018.

* cited by examiner

HYDRAULIC BRAKING SYSTEM HAVING AN ELECTRONIC CONTROL UNIT AND METHOD FOR OPERATING SAME

CROSS REFERENCE AND PRIORITY CLAIM

This patent application is a U.S. National Phase of International Patent Application No. PCT/EP2018/070304 filed Jul. 26, 2018, which claims priority to German Patent Application No. 10 2017 117 399.4, the disclosure of which being incorporated herein by reference in their entireties.

FIELD

Disclosed embodiments relates to a hydraulic braking system for braking a vehicle wheel according to a braking pressure control and pertain to so-called Light Rail Vehicles (LRV), for example trams, which are usually equipped with hydraulically operated friction brakes.

BACKGROUND

Hydraulically operated friction brakes can be implemented much more compactly than pneumatic braking equipment because of the much higher pressures of the working medium. Such compact components enable a high low-floor portion of the vehicle.

With hydraulically actuated friction brakes, the braking force may be applied by a friction pairing of a pad and a brake disk. The necessary contact forces of the lining to the brake disk are generated by a piston subjected to a hydraulic pressure. If influences are caused by frictional fluctuations, nonlinear spring characteristics and varying mechanical effectiveness are neglected, the resulting braking force in the case of active braking force generators may be directly proportional to the applied hydraulic pressure. In the case of spring-operated and hydraulically released passive braking force generators, there may be an indirect proportionality to the applied hydraulic pressure.

SUMMARY

Disclosed embodiments relate to a hydraulic braking system for braking a vehicle wheel according to a braking pressure control that includes a hydraulic pump driven by an electric motor for hydraulic pressure generation, an electronic control unit for the determination of at least one control error, based on a measured actual braking pressure compared with a pressure demand setpoint, which controls at least one actuator for a pressure increase and/or a pressure reduction of the actual braking pressure to adjust to the pressure demand setpoint.

Furthermore, disclosed embodiments also relate to a method for braking a vehicle wheel according to this braking pressure control and a related computer program product.

BRIEF DESCRIPTION OF THE FIGURES

Technical utility of the disclosed embodiments are described in more detail together with the description on the basis of the figures, in which.

DETAILED DESCRIPTION

In general, braking force should be as freely and accurately adjustable as possible in terms of magnitude and rate of change (gradient). A need for high pressure gradients arises in particular in the event of wheel/wheelset sliding caused by low traction and also when driving the vehicle off while simultaneously turning on the starting traction force, which requires a fast brake response.

A hydraulic braking system emerges from DE 10 2016 219 314 A1 in which two hydraulic pumps driven by an electric motor generate the braking pressure for two associated disk brakes. Both hydraulic circuits assigned here each contain two electromagnetically controllable valves, one valve being provided for a pressure increase and the other valve for a pressure reduction of the braking pressure. The associated hydraulic pump pumps the sucked-in hydraulic fluid to the supply pressure feed and, among other things, to a supply pressure input of the electromagnetic valve provided within the framework of the control valve arrangement for the pressure increase. An Electronic Control Unit (ECU) carries out the control of the two electromagnetic valves for generating the braking pressure according to the pressure demand setpoint.

Figure 1:
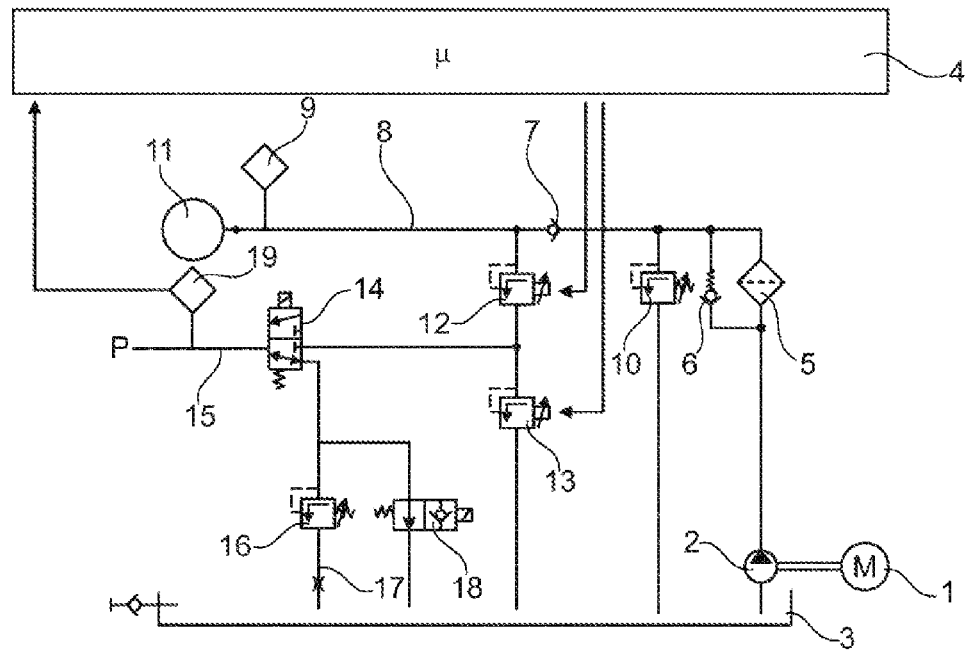
FIG. 1 shows a circuit diagram of a conventional hydraulic braking system according to the prior art, on which the disclosed embodiments are based.

From the generally known prior art, which is illustrated here in FIG. 1 with respect to a conventional hydraulic braking system of the type that is of interest here, a hydraulic pump 2 driven by an electric motor 1 may carry out a hydraulic pressure generation starting from a tank 3 for the storage of hydraulic fluid.

The binary switching on or off of the electric motor 1 may be carried out using an electronic control unit 4. The electric motor 1 may be switched on by the electronic control unit 4 only if supply pressure is to be restored. The hydraulic pressure produced by the hydraulic pump 2 passes to a pressure line 8 via a pressure filter 5 with a parallel check valve 6 and a further check valve 7 arranged downstream in series. A pressure encoder 9 for the storage pressure may also be connected to the pressure line 8. The pressure encoder 9 for the storage pressure reports its measurement signal to the electronic control unit 4 for monitoring purposes. On the opposite connection side of the check valve 7, the pressure line 8 may be provided with an outlet side pressure limiting valve 10 opening into the tank 3 in order to implement a maximum pressure limitation. Furthermore, the pressure line 8 may be connected to an oil pressure reservoir 11, which is usually a membrane reservoir.

For the pressure increase of the braking pressure P, the electronic control unit 4 operates the proportional pressure control valve 12, which serves as an actuator, in accordance with a pressure control. For the pressure reduction according to the controller, the electronic control unit 4 operates the proportional pressure control valve 13, here also serving as actuator, which opens into the tank 3 on the outlet side. On the other hand, the other proportional pressure control valve 12 provided for the implementation of a pressure increase may be connected to the pressure line 8 carrying the supply pressure.

Furthermore, in this conventional hydraulic brake system, an electromagnetically controllable safety brake valve 14 may be integrated into the braking pressure line 15. This may be operated independently of the control in the case of a malfunction in order to allow safe application of the brake by reducing the pressure in the braking pressure line 15. In this respect, the brake actuator—which is not shown further—may be in the form of a type of spring brake cylinder. The safe application of the brake may be carried out via a pressure limiting valve 16 with a downstream safety brake nozzle 17, which allows dosed emergency braking. Opening the parking brake valve 18 leads to a maximum pressure reduction, in order to enable the maximum braking force to be provided in accordance with safety braking.

The actual braking pressure applied in the braking pressure line 15 may be detected by a pressure encoder 19 in order to provide this as the actual value to the electronic control unit 4 for the control described above.

In such conventional hydraulic braking systems, the braking pressure may be, thus, controlled by the two proportional pressure control valves 12 and 13 as actuators, wherein the control of the braking pressure may be carried out by means of continuous measurement of the braking pressure by means of the pressure encoder 19 and compensation of the control error by a pressure increase or a pressure reduction by suitable control of the pressure limiting valves 12 or 13 as actuators.

The hydraulic pump 2 may be only used for the production of supply pressure due to the clocked operation. For this purpose, the electric motor 1 for the drive of the hydraulic pump 2 may be usually operated with a certain rotation direction and torque direction.

In accordance with disclosed embodiments, an improvement to a hydraulic braking system of the generic type is provided so that the technical complexity of the valve is reduced.

Disclosed embodiments are configured so that, without any valve technology actuators, the electronic control unit controls the electric motor, which acts as an actuator to compensate for the control error such that the hydraulic pump causes a pressure increase of the braking pressure in one direction of rotation and causes a pressure reduction of the braking pressure in the other direction of rotation.

Disclosed embodiments are based on the knowledge that, since the working pressure for braking force generation may be derived from the supply pressure alone and the hydraulic fluid may be an incompressible medium, the control of the braking pressure can be carried out directly by suitable control of the electric motor.

Advantageously, otherwise common pressure control valves are therefore omitted and an additional pressure accumulator may also not be required. Due to the simplified technical design, parts of the hydraulic piping are also omitted. Experiments have revealed that release times in the region of 180 ms are achievable with a supply of for example two 32 kN braking force generators with 23 cm$^3$ working volume each without a pressure accumulator. Reliable stationary control accuracies without overshooting during settling could also be achieved.

To achieve high control accuracy, the hydraulic pump may be implemented as a gear pump. The electric motor may be designed to achieve a compact design as an external rotor motor, in which, optionally, a permanent magnet ring may be arranged as the externally running rotor. A permanently electrically excited synchronous motor may be used as an electric motor.

In accordance with disclosed embodiments, a shut-off valve may be controlled by the electronic control unit that may be inserted in the pressure line carrying the braking pressure, which may be supplied by the hydraulic pump, in order to implement a shut-off position in addition to the pressure increase and pressure reduction directly caused by the hydraulic pump.

Additionally, a safety brake valve may be inserted into the pressure line carrying the braking pressure for the brake to be applied safely in the event of a malfunction. If, for example, the hydraulic pump is blocked, safe application of the brakes can be carried out outside of the control used in normal operation by actuating the safety brake valve in order to ensure safe braking even in the event of a malfunction of the electronic control system.

In accordance with disclosed embodiments, a pressure encoder may be connected to the pressure line carrying the braking pressure on the outlet side of the shut-off valve to measure the actual braking pressure. This pressure encoder may be electrically connected to the electronic control unit for actual value specification.

The electric motor may be controlled by the electronic control unit with respect to a positive and negative speed as well as with respect to a positive and negative torque. Thus, control of the electric motor and its operation may take place in all four quadrants of the speed-torque coordinate system. A positive speed of the electric motor may cause a pressure increase of the braking pressure. A negative speed of the electric motor may cause a pressure reduction of the braking pressure. With an increasing positive torque, the braking pressure generation may be accelerated and with a decreasing negative torque, the braking pressure generation may be decelerated.

In accordance with disclosed embodiments, this control can be implemented in the form of a computer program product with program code that may be used to carry out the control method when the computer program product may be run on the electronic control unit of the hydraulic braking system. In addition, storage of the program code on a computer-readable medium may be also possible.

Figure 2:
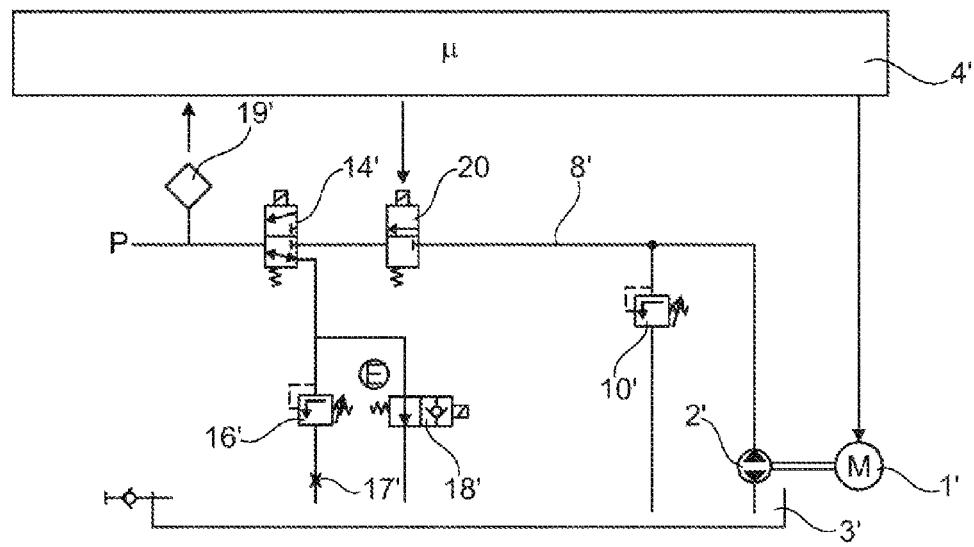
FIG. 2 shows a circuit diagram of a hydraulic braking system according to the invention with an electric motor acting as an actuator.

With this understanding of the disclosed embodiments in mind, according to FIG. 2, the hydraulic braking system according to the disclosed embodiments includes an electric motor 1', which drives a hydraulic pump 2' in both directions of rotation. The hydraulic pump 2' may be designed as a gear pump and removes hydraulic fluid from a tank 3' on the inlet side. On the outlet side, the hydraulic pump 2' may be connected to a pressure line 8' carrying the braking pressure. A pressure limiting valve 10' for dissipating an overpressure into the tank 3' may branch off from the pressure line 8' carrying the braking pressure.

The electric motor 1' may be controlled by an electronic control unit 4' as an actuator for compensation of control errors in such a way that in one direction of rotation the hydraulic pump 2' causes pressure increases of the braking pressure in the pressure line carrying the braking pressure 8', whereas in the other direction of rotation a pressure reduction of the braking pressure may be caused.

Furthermore, a shut-off valve 20 that can also be controlled by the electronic control unit 4' in addition to the electric motor 1' may be inserted into the pressure line 8' carrying the braking pressure supplied by the hydraulic pump 2'. With the shut-off valve 20, a shut-off position can be realized in addition to the pressure increase and the pressure reduction directly caused by the hydraulic pump 2'.

A safety brake valve 14', which may also be inserted in the pressure line 8' carrying the braking pressure, may be connected downstream of the shut-off valve 20. The safety brake valve 14' may be used for safe application of the brake in the case of a malfunction of pressure control components. If the safety brake valve 14' is operated independently of this, it may be possible to introduce dosed braking by means of a downstream choke 17' under the opening pressure of the outlet-side downstream pressure limiting valve 16'. In parallel with this, there may also be the possibility to initiate the full parking braking force according to safety braking by means of a parking brake valve 18' that also branches off on the outlet side of the release valve 14'. The actuated parking valve 18' bypasses in this respect the function of the dosed braking of the otherwise effective pressure limiting valve 16'.

In addition, a pressure encoder 19' may measure the actual braking pressure in the pressure line 8' carrying the braking pressure and passes the measured value to the electronic control unit 4' for the purpose of specifying the actual value for the control described above.

REFERENCE CHARACTER LIST

1 Electric motor
2 Hydraulic pump
3 Tank
4 Electronic control unit
5 Pressure filter
6 Check valve
7 Check valve
8 Pressure line
9 Pressure encoder
10 Pressure limiting valve
11 Oil pressure reservoir
12 Proportional pressure control valve
13 Proportional pressure control valve
14 Safety brake valve
15 Braking pressure line
16 Pressure limiting valve
17 Choke
18 Parking brake valve
19 Pressure encoder
20 Shut-off valve
P Braking pressure

The invention claimed is:

1. A hydraulic braking system for braking a vehicle wheel in accordance with a braking pressure control, the system comprising:
   a hydraulic pump driven by an electric motor for hydraulic pressure generation; and
   an electronic control unit for the determination of at least one control value for compensating a control error based on a measured actual braking pressure compared to a pressure demand setpoint, which controls the electric motor as an actuator for a pressure increase or a pressure reduction of the braking pressure when adjusting to the pressure demand setpoint,
   wherein the electronic control unit controls the electric motor as the actuator to compensate the control error in such a way that in one direction of rotation the hydraulic pump causes a pressure increase of the braking pressure and in the other direction of rotation causes a pressure reduction of the braking pressure,
   wherein a shut-off valve controlled by the electronic control unit is located in a pressure line between and interconnecting the hydraulic pump and a brake actuator and a pressure limiting valve is positioned upstream the shut-off valve to dissipate an overpressure in the pressure line from the hydraulic pump, and
   wherein a safety brake valve is located downstream the shut-off valve along the pressure line and configured to introduce dosed braking via a downstream choke and a full parking braking force.

2. The hydraulic braking system of claim 1, wherein the hydraulic pump is a gear pump.

3. The hydraulic braking system of claim 1, wherein the electric motor is a permanently excited synchronous motor.

4. The hydraulic braking system of claim 3, wherein the electric motor is an external rotor motor.

5. The hydraulic braking system of claim 1, wherein the shut-off valve is controlled by the electronic control unit inserted into the pressure line carrying the braking pressure supplied by the hydraulic pump to implement a shut-off position in addition to the pressure increase and pressure reduction directly caused by the hydraulic pump.

6. The hydraulic braking system of claim 1, wherein the safety brake valve is inserted into the pressure line carrying the braking pressure for safe application of the brake in the event of a malfunction.

7. The hydraulic braking system of claim 6, further comprising a pressure encoder for measuring the actual braking pressure connected to the pressure line carrying the braking pressure on the outlet-side of the shut-off valve, wherein the pressure encoder is electrically connected to the electronic control unit for actual value specification.

8. A method of braking at least one vehicle wheel in accordance with a braking pressure control system, the method comprising:
   using a hydraulic pump driven by an electric motor for hydraulic pressure generation;
   determining at least one control value for compensating a control error by an electronic control unit based on a measured actual braking pressure in comparison with a pressure demand setpoint to control the electric motor as an actuator for a pressure increase or a pressure reduction of the actual braking pressure when adjusting to the pressure demand setpoint; and
   controlling the electric motor as the actuator by the electronic control unit to compensate for the control error such that, in one direction of rotation, the hydraulic pump generates a pressure increase in the braking pressure and, in the other direction of rotation, the hydraulic pump generates a pressure reduction of the braking pressure,
   wherein a shut-off valve controlled by the electronic control unit is located in a pressure line between and interconnecting the hydraulic pump and a brake actuator and a pressure limiting valve is positioned upstream the shut-off valve,
   wherein a safety brake valve is located downstream the shut-off valve along the pressure line and configured to introduce dosed braking via a downstream choke and a full parking braking force.

9. The method of claim 8, wherein the electric motor is controlled with regard to a positive and negative speed as well as a positive and negative torque.

10. The method of claim 8, wherein the hydraulic pump is a gear pump.

11. The method of claim 8, wherein the electric motor is a permanently excited synchronous motor.

12. The method of claim 11, wherein the electric motor is an external rotor motor.

13. The method of claim 8, wherein the shut-off valve is controlled by the electronic control unit inserted into the pressure line carrying the braking pressure supplied by the hydraulic pump to implement a shut-off position in addition to the pressure increase and pressure reduction directly caused by the hydraulic pump.

14. The method of claim 8, wherein the safety brake valve is inserted into the pressure line carrying the braking pressure for safe application of the brake in the event of a malfunction.

15. The method of claim 14, further comprising measuring the actual braking pressure via a pressure encoder connected to the pressure line carrying the braking pressure on the outlet-side of the shut-off valve, wherein the pressure encoder is electrically connected to the electronic control unit for actual value specification.

16. A non-transitory computer readable medium including program code for carrying out a method of braking at least one vehicle wheel in accordance with a braking pressure control system when the program code is run on an electronic control unit of the hydraulic braking system, the method comprising:
- using a hydraulic pump driven by an electric motor for hydraulic pressure generation;
- determining at least one control value for compensating a control error by an electronic control unit based on a measured actual braking pressure in comparison with a pressure demand setpoint to control the electric motor as an actuator for a pressure increase or a pressure reduction of the actual braking pressure when adjusting to the pressure demand setpoint; and
- controlling the electric motor as an actuator by the electronic control unit to compensate for the control error such that, in one direction of rotation, the hydraulic pump generates a pressure increase in the braking pressure and, in the other direction of rotation, the hydraulic pump generates a pressure reduction of the braking pressure,
- wherein the non-transitory computer readable medium is configured to control a shut-off valve located in a pressure line between and interconnecting the hydraulic pump and a brake actuator and a pressure limiting valve is positioned upstream the shut-off valve,
- wherein a safety brake valve is located downstream the shut-off valve along the pressure line and configured to introduce dosed braking via a downstream choke and a full parking braking force.

17. The non-transitory computer readable medium of claim 16, wherein the electric motor is controlled with regard to a positive and negative speed as well as a positive and negative torque.

* * * * *